US008856937B1

(12) United States Patent
Wüest et al.

(10) Patent No.: US 8,856,937 B1
(45) Date of Patent: Oct. 7, 2014

(54) METHODS AND SYSTEMS FOR IDENTIFYING FRAUDULENT WEBSITES

(75) Inventors: Candid Wüest, Uhwiesen (CH); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 1552 days.

(21) Appl. No.: 12/147,800

(22) Filed: Jun. 27, 2008

(51) Int. Cl.
*H04L 29/06* (2006.01)
*G06F 21/56* (2013.01)

(52) U.S. Cl.
CPC ............ *H04L 63/1483* (2013.01); *G06F 21/56* (2013.01)
USPC .................... 726/26; 726/22; 726/24; 726/25; 713/188

(58) Field of Classification Search
CPC .................................................. H04L 63/1483
USPC .................... 707/9, 102; 713/176; 726/24, 26
See application file for complete search history.

(56) References Cited

U.S. PATENT DOCUMENTS

| 7,496,634 | B1 * | 2/2009 | Cooley ........................... 709/206 |
| 7,698,442 | B1 * | 4/2010 | Krishnamurthy et al. .... 709/229 |
| 7,930,289 | B2 * | 4/2011 | Cheshire ........................ 707/709 |
| 7,958,555 | B1 * | 6/2011 | Chen et al. ...................... 726/22 |
| 8,621,604 | B2 * | 12/2013 | Chien ............................. 726/22 |
| 8,701,185 | B2 * | 4/2014 | Krishnamurthy et al. ...... 726/22 |
| 2006/0020812 | A1 * | 1/2006 | Steinberg et al. .............. 713/181 |
| 2006/0069697 | A1 * | 3/2006 | Shraim et al. ................. 707/102 |
| 2007/0118528 | A1 * | 5/2007 | Choi et al. ........................ 707/9 |
| 2008/0046738 | A1 * | 2/2008 | Galloway et al. ............. 713/176 |

FOREIGN PATENT DOCUMENTS

| EP | 1863240 | 12/2007 |
| WO | WO 2006026921 A2 * | 3/2006 |

OTHER PUBLICATIONS

Weblog: News from the Lab, Sep. 27, 2007 (19 pgs.).
ComputerWeekly.com Article of Jul. 10 2006 (5 pgs.).

* cited by examiner

*Primary Examiner* — Mohammad L Rahman
(74) *Attorney, Agent, or Firm* — Holland & Hart LLP (57) ABSTRACT

A computer-implemented method for identifying fraudulent websites. The method may include identifying a fraudulent-website toolkit. The fraudulent-website toolkit may be programmed for use in creating a fraudulent website. The method may also include determining a characteristic of the fraudulent-website toolkit and using the characteristic of the fraudulent-website toolkit to identify a website created using the fraudulent-website toolkit. The website created using the fraudulent-website toolkit may be identified by searching for websites that comprise the characteristic of the fraudulent-website toolkit. The website created using the fraudulent-website toolkit may also be identified by determining that a web browser is attempting to access the website. Various other methods and computer-readable media are also disclosed.

18 Claims, 9 Drawing Sheets

Fraudulent-Website Toolkit
300

HTML
310

Java Script
320

PHP
330

Image Files
340

METHODS AND SYSTEMS FOR IDENTIFYING FRAUDULENT WEBSITES

BACKGROUND

Fraudulent websites, such as phishing sites, may be websites that resemble a well-known brand (e.g., e-bay, a bank, a credit card company, etc.) in order to trick a user into revealing personal information and credentials. An attacker may collect sensitive data through the fraudulent website and may later use the data to the detriment of the user. Phishing is a significant problem, not only because of the fraud involved, but also because it undermines peoples' confidence in online transactions and makes it difficult for banks and other companies to communicate with their customers via email.

Due to the complex nature of phishing websites, in the past only sophisticated programmers may have been able to create phishing websites. However, unsophisticated attackers may now be able to set up phishing websites by using a phishing kit. Phishing kits may be a collection of files that allow people with relatively little technical skill to create a phishing website. Phishing kits are widely available and may be purchased or even downloaded for free. With the advent of phishing kits, the number of phishing websites online at any given moment has dramatically increased. Traditional security measures have not been able to adequately protect users from these phishing attacks.

SUMMARY

Embodiments of the instant disclosure may detect websites created by fraudulent-website toolkits by analyzing characteristics of fraudulent-website toolkits and identifying websites with these characteristics. For example, security software may identify a fraudulent-website toolkit, such as a phishing toolkit. The security software may determine a characteristic of the fraudulent-website toolkit. Then, the security software may use the characteristic of the fraudulent-website toolkit to identify a website created using the fraudulent-website toolkit.

The characteristics gathered from fraudulent-website toolkits may be used in a number of ways to improve protection against fraudulent websites. A security module may use the characteristic of the fraudulent-website toolkits to identify a website and may determine that the website comprises the characteristic of the fraudulent-website toolkit. In some embodiments, identifying a website may comprise determining that a web browser is attempting to access the website. In other embodiments, the security module may search for websites that comprise the characteristic of the fraudulent-website toolkit. Searching for websites may comprise creating a search engine query that includes the characteristic of the fraudulent-website toolkit, directing the search engine to perform a search using the search engine query, and receiving the results from the search. After finding fraudulent websites, the security module may block access to the fraudulent websites and/or may include uniform resource locators for the fraudulent websites in a black list.

The characteristic of the fraudulent-website toolkit may be a characteristic that would distinguish a fraudulent website created by the fraudulent-website toolkit from a legitimate website being spoofed by the fraudulent-website toolkit. For example, a characteristic of the fraudulent-website toolkit may comprise a script file that is not a part of the legitimate website, a log file that is not a part of the legitimate website, a folder that is not a part of the legitimate website, and/or an email-sender script.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various exemplary embodiments and should not be taken to be limiting in any way. The present disclosure is directed to methods and systems for identifying fraudulent websites. For example, in some embodiments security software may identify fraudulent-website toolkits and determine characteristics of the fraudulent-website toolkits. The security software may use the characteristics of the fraudulent-website toolkits to identify websites created using the fraudulent-website toolkits. Embodiments of the instant disclosure may also provide various other features and advantages.

Figure 1:
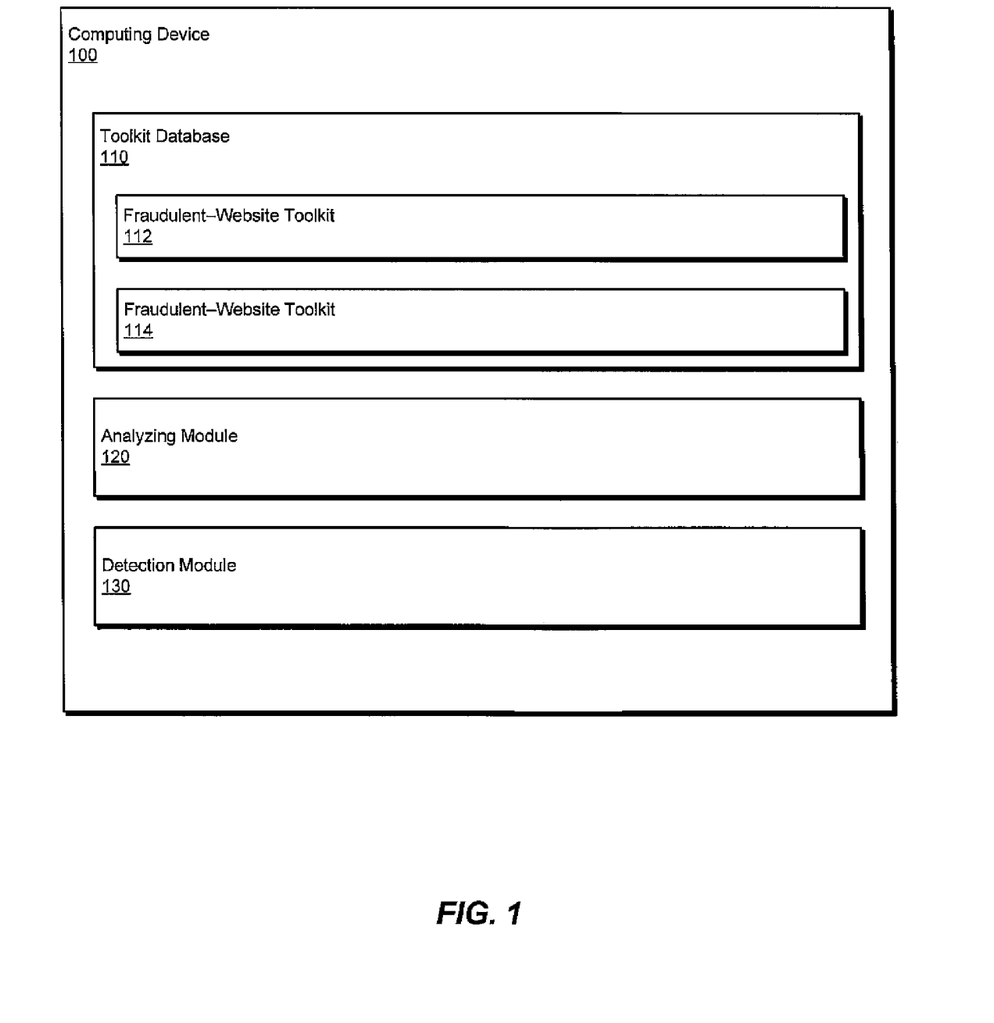
FIG. 1 is a block diagram of a computing device with an analyzing module for analyzing fraudulent-website toolkits and a detection module for detecting websites created by fraudulent-website toolkits according to certain embodiments.
Figure 2:
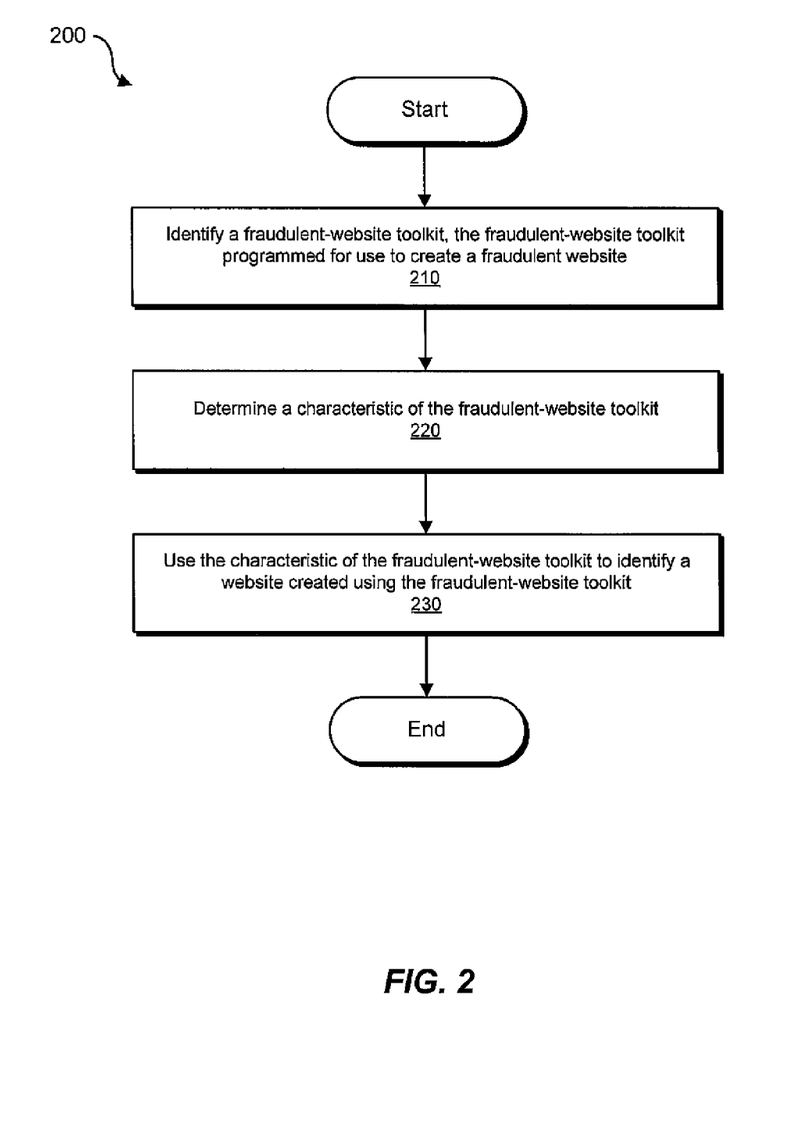
FIG. 2 is a flow diagram of an exemplary method for identifying fraudulent websites according to certain embodiments.
Figure 3:
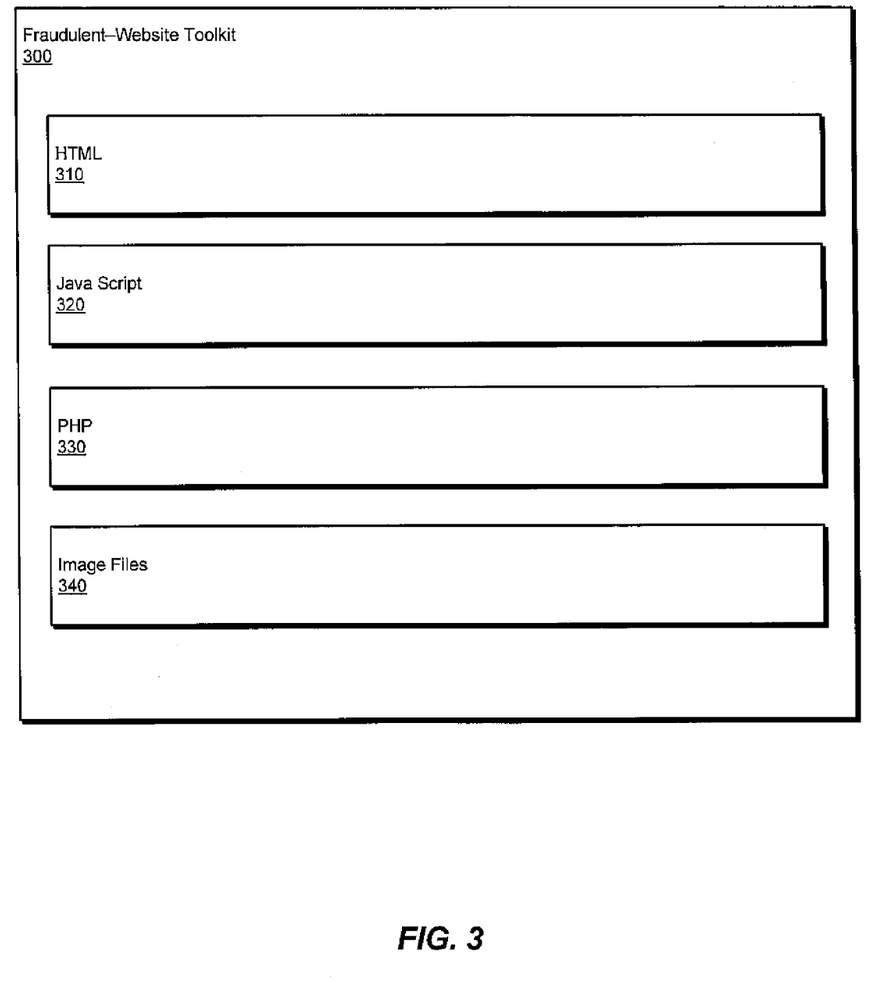
FIG. 3 is a block diagram of an exemplary fraudulent-website toolkit according to certain embodiments.
Figure 4:
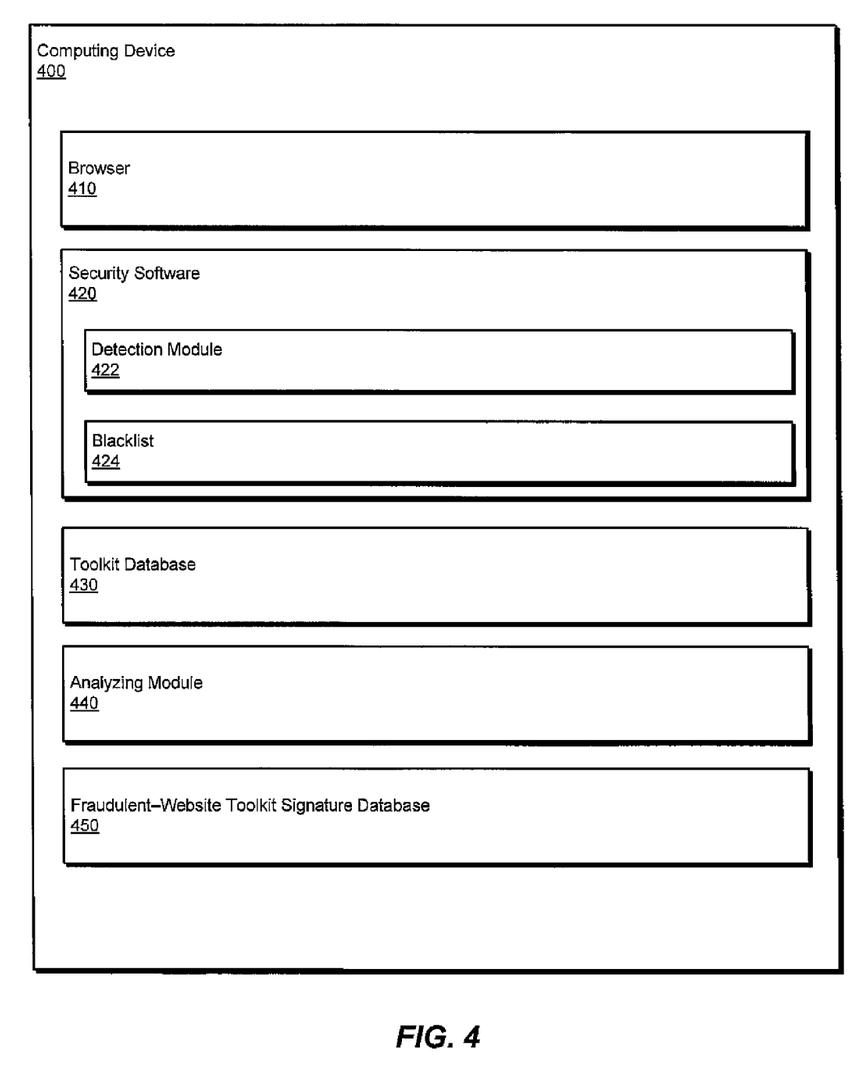
FIG. 4 is a block diagram of an exemplary computing device according to certain embodiments.
Figure 5:
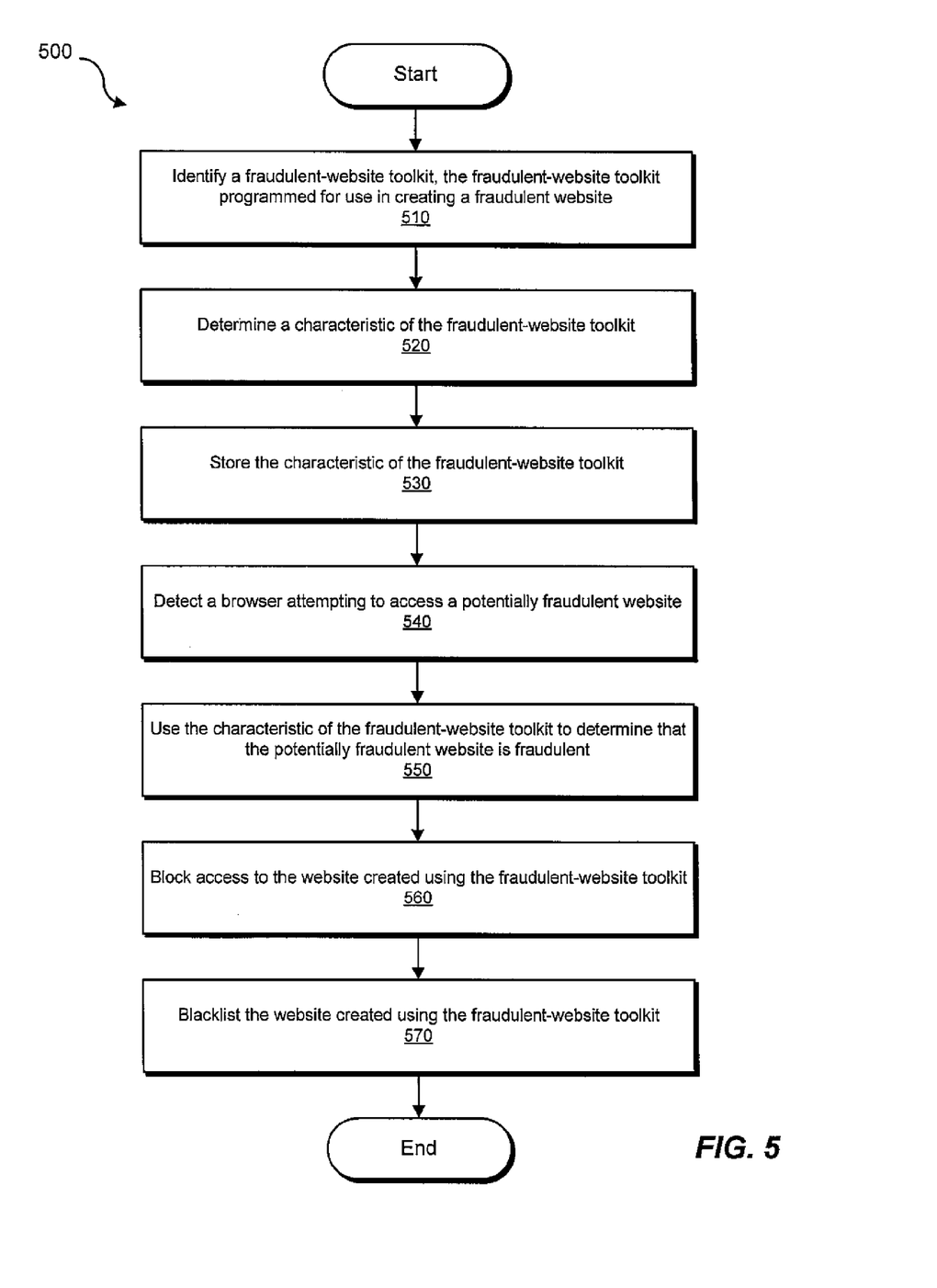
FIG. 5 is a flow diagram of an exemplary method for identifying fraudulent websites according to certain embodiments.
Figure 6:
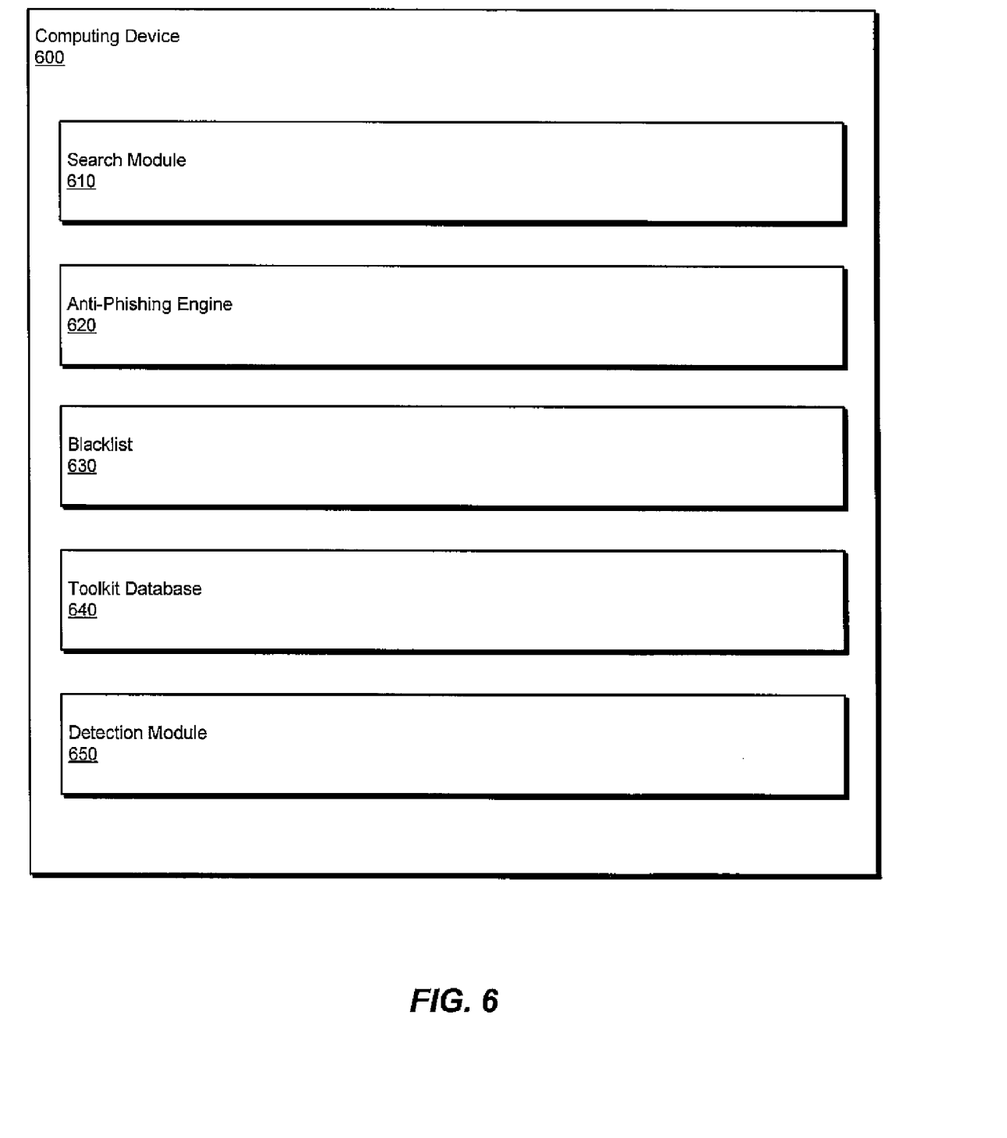
FIG. 6 is a block diagram of an exemplary computing device that includes search module, an anti-phishing engine, and an analyzing module according to certain embodiments.
Figure 7:
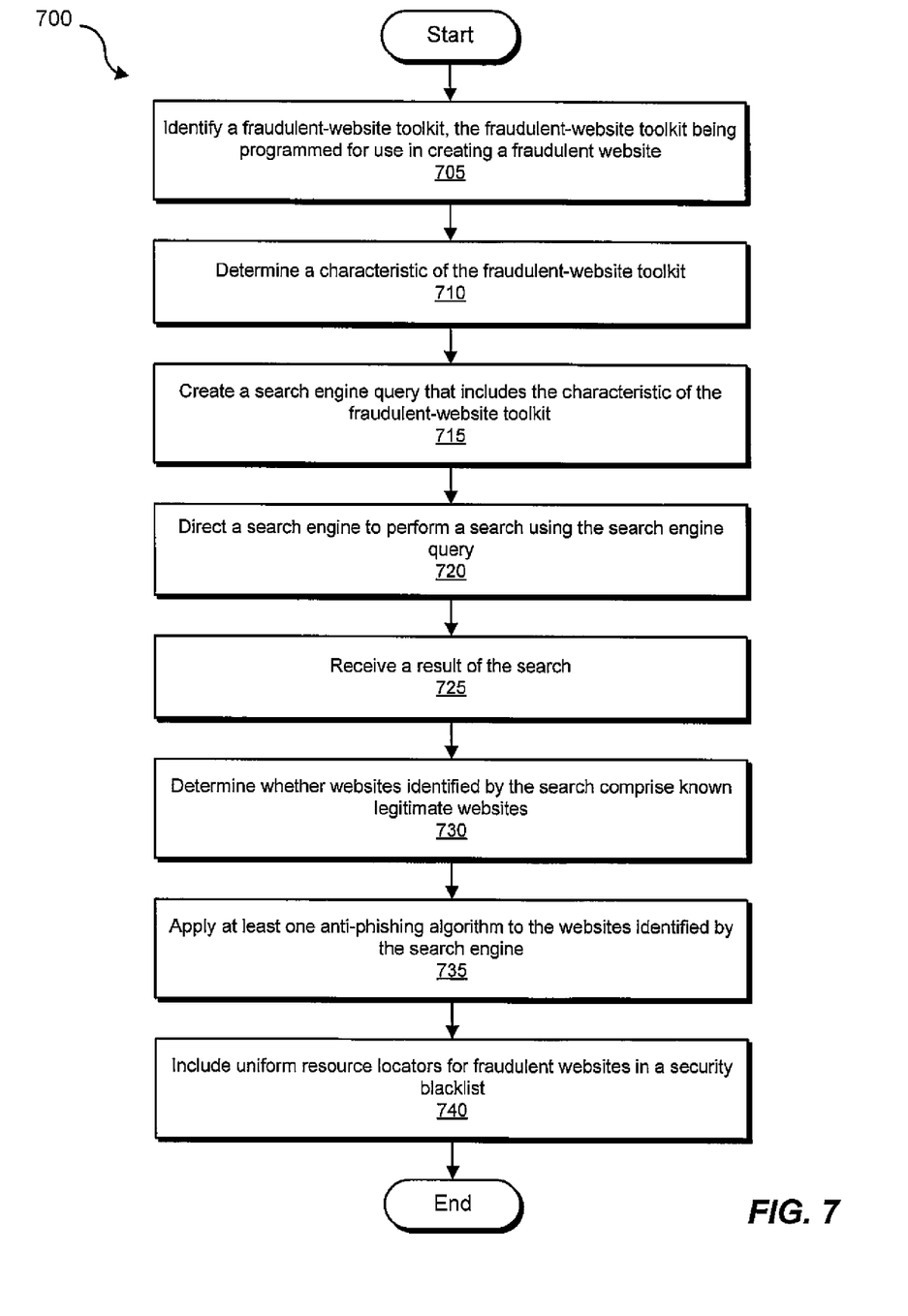
FIG. 7 is a flow diagram of an exemplary method for identifying fraudulent websites according to certain embodiments.

FIG. 1 illustrates a computing device that includes a fraudulent-website toolkit database, an analyzing module for analyzing fraudulent-website toolkits, and a detection module for detecting websites created using fraudulent-website toolkits. FIG. 2 illustrates a method performed by the analyzing and detection modules in FIG. 1. FIG. 3 shows an exemplary fraudulent-website toolkit. FIGS. 4 and 5 and the corresponding description present embodiments of detecting that a user may be navigating to a fraudulent website. FIGS. 6 and 7 and the corresponding description present embodiments of searching for fraudulent websites using characteristics of fraudulent-website toolkits.

FIG. 1 shows a computing device 100 that includes a fraudulent-website toolkit database 110. Fraudulent-website toolkit database 110 may include multiple fraudulent-website toolkits, such as fraudulent-website toolkit 112 and fraudulent-website toolkit 114. Computing device 100 may include an analyzing module 120 for analyzing fraudulent-website toolkits 112 and 114. Computing device 100 may also include a detection module 130 for detecting websites created by a fraudulent-website toolkit.

Computing device 100 may be a desktop computer, a laptop computer, a handheld computer, a network computing device, or any other suitable computing device. Toolkit database 110 may be any data structure or database capable of storing fraudulent-website toolkits. While FIG. 1 shows toolkit database 110 on computing device 100, toolkit database 110 may also be stored on an external storage device or network device. Analyzing module 120 may be any module, application, or other computer-executable code capable of determining characteristics of fraudulent-website toolkits. Detection module 130 may be any module, application, or other computer-executable code capable of using characteristics of fraudulent-website toolkits to identify websites created using fraudulent-website toolkits.

FIG. 2 illustrates an exemplary method 200 for identifying fraudulent websites. The steps illustrated in FIG. 2 may be performed on and/or by the components illustrated in computing device 100. FIG. 2 begins with the step of identifying a fraudulent-website toolkit (step 210). A fraudulent-website toolkit may be any set of files or software tools that may aid a malicious programmer in creating a fraudulent website. FIG. 3 and the corresponding description present various embodiments of fraudulent-website toolkits.

The step of identifying a fraudulent-website toolkit may refer to selecting a fraudulent-website toolkit from a fraudulent-website toolkit database in order to analyze the fraudulent-website toolkit. For example, analyzing module 120 from FIG. 1 may identify fraudulent-website toolkit 112 in toolkit database 110. In other embodiments, the phrase "identifying a fraudulent-website toolkit" may refer to a process of searching for and gathering fraudulent-website toolkits.

Fraudulent-website toolkits may be gathered from various sources. For example, a security software company may receive fraudulent-website toolkits from customer sample submissions. Security software and/or security software companies may also monitor web forms and analyze fraudulent websites, such as active phishing sites, to identify fraudulent-website toolkits.

After identifying a fraudulent-website toolkit, an analyzing module, such as analyzing module 120, may determine a characteristic of the fraudulent-website toolkit. Determining a characteristic of the fraudulent-website toolkit may comprise identifying a characteristic of the fraudulent-website toolkit that would distinguish a fraudulent website created by the fraudulent-website toolkit from a legitimate website being spoofed by the fraudulent website. For example, the characteristic of the fraudulent-website toolkit may include a script file that is not a part of the legitimate website, a log file that is not a part of the legitimate website, a folder that is not a part of the legitimate website, and HTML tag, and/or an email-sender script. The email-sender script may be programmed to send emails that carry data gathered by the fraudulent website to a malicious programmer.

As noted, analyzing module 120 may determine a characteristic of the fraudulent-website toolkit that distinguishes websites created by the fraudulent-website toolkit from legitimate websites. In many situations, these characteristics may not be visible in a main website created by the fraudulent-website toolkit. These characteristics may be additional script or log files that are not visible to an end user but are included to allow the fraudulent website to gather and send sensitive information to a malicious programmer. The characteristics or information that distinguish fraudulent websites created by fraudulent-website toolkits from legitimate websites may be referred to as signatures or fingerprints of fraudulent-website toolkits. In addition to or instead of using an analyzing module to determine characteristics of fraudulent-website toolkits, characteristics of fraudulent-website toolkits may be determined manually.

In some embodiments, an analyzing module may analyze multiple fraudulent-website toolkits and create, a database of characteristics of fraudulent-website toolkits. For example, analyzing module 120 may analyze fraudulent-website toolkits 112 and 114. Analyzing module 120 may then store characteristics of fraudulent-website toolkits 112 and 114 in a database on computing device 100 or on any other suitable storage medium.

A detection module, such as detection module 130, may use the characteristic of the fraudulent-website toolkit to identify a website created using the fraudulent-website toolkit (step 230). In some embodiments, using the characteristic of a fraudulent-website toolkit to identify a website created using the fraudulent-website toolkit may include the steps of identifying the website and determining that the website comprises the characteristic of the fraudulent-website toolkit. The website created using the fraudulent-website toolkit may be identified during a search for websites that comprise the characteristic of the fraudulent-website toolkit. Such a search may be a proactive measure to identify and blacklist fraudulent websites. In other embodiments, the website may be identified when a web browser is attempting to access the fraudulent website. FIGS. 4 and 5 and the corresponding description present embodiments of detecting a browser as it attempts to access a fraudulent website. FIGS. 6 and 7 and the corresponding description provide embodiments of searching for fraudulent websites. Various other algorithms may use the characteristic of the fraudulent-website toolkit to identify a website created using the fraudulent-website toolkit.

FIG. 3 illustrates a fraudulent-website toolkit 300. The fraudulent-website toolkit may be any set of software tools and/or files that may be used in setting up a fraudulent website. A fraudulent-website toolkit may be a phishing kit, a kit for setting up a scam website, or a kit for creating any other type of fraudulent website. Fraudulent-website toolkits may provide simple interfaces that allow malicious programmers to convincingly reproduce legitimate websites and capture information entered in the fraudulent website.

FIG. 3 shows that a fraudulent-website toolkit 300 may include HTML files 310, JavaScript files 320, PHP files 330, and/or image files 340 that may be useful in creating a fraudulent website. For example, image files 340 may be image files for a legitimate website that may be used in replicating the legitimate website. HTML files 310, JavaScript files 320, and PHP files 330 may contain the code necessary to create a website and to fraudulently obtain information through the website.

A common type of fraudulent website toolkit is a phishing kit. Phishing kits may allow unsophisticated programmers to launch phishing attacks. As shown in FIG. 3, a phishing kit may include graphics, code, and other information that help malicious programmers create imitations of legitimate sites. Some phishing kits may be universal phishing kits that allow programmers to spoof any legitimate websites that they choose.

After setting up a fraudulent website using a phishing kit, the fraudulent website developer may send spoofed email to numerous email addresses. The spoofed email may appear to come from a legitimate source and may direct a recipient to the fraudulent website. Some phishing kits may include spamming software and email addresses to automate the process of sending out spoofed emails. Phishing attacks may attempt to acquire user names, passwords, credit card information, social security numbers, birth dates, and other potentially sensitive information. Phishing attacks often target banks, e-commerce companies, and other financial institutions, and may cause these companies and their users to lose billions of dollars per year.

As previously mentioned, FIGS. 4 and 5 illustrate embodiments of detecting a fraudulent website by detecting a browser attempting to access a fraudulent website. FIG. 4 shows a computing device 400. Computing device 400 may include a browser 410, security software 420, a toolkit database 430, an analyzing module 440, and a fraudulent-website toolkit signature database 450.

Browser 410 may be any computer program configured to browse the Internet. For example, browser 410 may be an INTERNET EXPLORER browser, a FIREFOX browser, a SAFARI browser, or any other suitable browser. Analyzing module 440 may determine characteristics of fraudulent-website toolkits in toolkit database 430. Thus, analyzing module 440 may be comparable to analyzing module 120 in FIG. 1. Analyzing module 440 may store the characteristics of fraudulent-website toolkits in fraudulent-website toolkits signature database 450. Fraudulent-website toolkits signature database 450 may be a database of characteristics of fraudulent website toolkits.

Security software 420 may include a detection module 422 and a blacklist 424. Security software 420 may monitor the websites that browser 410 is attempting to access. Detection module 422 may determine whether the website that browser 410 is attempting to access is suspect of being fraudulent. If detection module 422 suspects that the website is fraudulent, detection module 422 may use signatures from fraudulent-website toolkit signature database 450 to determine whether the website contains any of the characteristics of toolkits from toolkit database 430. If the website contains characteristics of a fraudulent-website toolkit, detection module 422 may determine that the website is fraudulent.

FIG. 5 illustrates an exemplary method that may be performed by the elements shown in FIG. 4. An analyzing module, such as analyzing module 440 may identify fraudulent-website toolkits (step 510). Fraudulent-website toolkits may be programmed for use in creating a fraudulent website. The analyzing module may then determine a characteristic of the fraudulent-website toolkit (step 520). The analyzing module may store the characteristic of the fraudulent-website toolkit in database (step 530). In some embodiments, analyzing module 440 may repeat steps 510, 520, and 530 numerous times (e.g., for each toolkit in a fraudulent-website toolkit database, such as toolkit database 430.)

Security software, such as security software 420, may detect a browser attempting to access a potentially fraudulent website (step 540). Security software 420 may use various different heuristics and/or algorithms to determine whether the browser is attempting to access a potentially fraudulent website. After determining that the website is potentially fraudulent, the security software may use the characteristic of the fraudulent-website toolkit to determine that the potentially fraudulent website is in fact fraudulent (step 550). In some embodiments, the security software may skip step 540. For example, the security software may check each website to which a browser navigates (rather than just checking websites that are determined to be potentially fraudulent) against signatures in a fraudulent-website toolkit database.

The security software may perform any suitable security measure after determining that a website is fraudulent. For example, the security software may block access to the website (step 560). The security software may also include the website in a blacklist, such as blacklist 424 (step 570).

FIGS. 6 and 7 show embodiments of searching for websites that comprise characteristics of fraudulent-website toolkits. FIG. 6 illustrates a computing device 600. Computing device 600 may be a desktop computer, laptop computer, handheld computer, network computing device, or any other suitable computing device. Computing device 600 may include a search module 610, an anti-phishing engine 620, a blacklist 630, a toolkit database 640, and a detection module 650.

Search module 610 may be any module, application, or other computer-executable code capable of searching for websites that comprise characteristics of fraudulent-website toolkits. Anti-phishing engine 620 may be any module, application, or other computer-executable code capable of determining whether a website may be legitimate. Blacklist 630 may be a list of fraudulent websites. Toolkit database 640 may be a database of fraudulent-website toolkits, similar to toolkit database 110. Detection module 650 may be any module, application, or other computer-executable code programmed to determine whether a website includes a characteristic of a fraudulent-website toolkit.

FIG. 7 shows an exemplary method that may be implemented by elements of FIG. 6. First, a fraudulent-website toolkit may be identified (step 705). An analyzing module may determine a characteristic of the fraudulent-website toolkit (step 710). As an example, the characteristic of the fraudulent-website toolkit may be the file name "Malicious.php," where Malicious.php is a file in the fraudulent web-site toolkit. Malicious.php may be a file that is included in the fraudulent-website but not in the legitimate website that the fraudulent website is attempting to spoof.

A search module, such as search module 610, may create a search engine query that includes the characteristic of the fraudulent-website toolkit (step 715). For example, search module 610 may form queries to search engines like GOOGLE, YAHOO, or any other search engines for websites with characteristics of fraudulent-website toolkits to find new fraudulent sites. An example of a GOOGLE query may be "inurl:Malicious.php," which may provide search results of documents containing the word "Malicious.php." Search module 610 may direct the search engine (e.g., GOOGLE) to perform the search using the search engine query (step 720).

Search modules may also use various types of search engine queries to identify websites with characteristics of fraudulent-website toolkits. In other embodiments, a search module may attempt to identify malicious websites by accessing URL feeds of newly registered domains. The search module may look for characteristics of fraudulent-website toolkits in websites associated with the newly-registered domains.

Search module 610 may receive a result of the search from the search engine (step 725). The search results may contain some legitimate websites, and therefore additional steps may need to be performed to determine which websites returned by the search engine are legitimate and which are fraudulent. Anti-phishing engine 620 may analyze results of the search to determine whether websites identified by the search comprise known legitimate websites (step 730). In some embodiments, step 730 may be skipped. Anti-phishing engine 620 may also apply an anti-phishing algorithm to the websites identified by the search engine to determine whether the websites are fraudulent (step 735). By performing one or both of steps 730 and 735, anti-phishing engine 620 may be able to eliminate one or more false positives from the search results. In some embodiments, steps 730 and 735 may not be performed. Finally, detection module 650 may include uniform resource locators of the fraudulent websites returned by the search results in a blacklist, such as blacklist 630 (step 740).

The process illustrated in FIG. 7 may proactively search for and identify fraudulent websites, which may help security software companies better protect their customers against phishing attacks. In some embodiments, the results of the method illustrated in FIG. 7 may be used to fine-tune heuristics and algorithms for detecting fraudulent web pages. Embodiments of the instant disclosure may also provide various other features and advantages.

Figure 8:
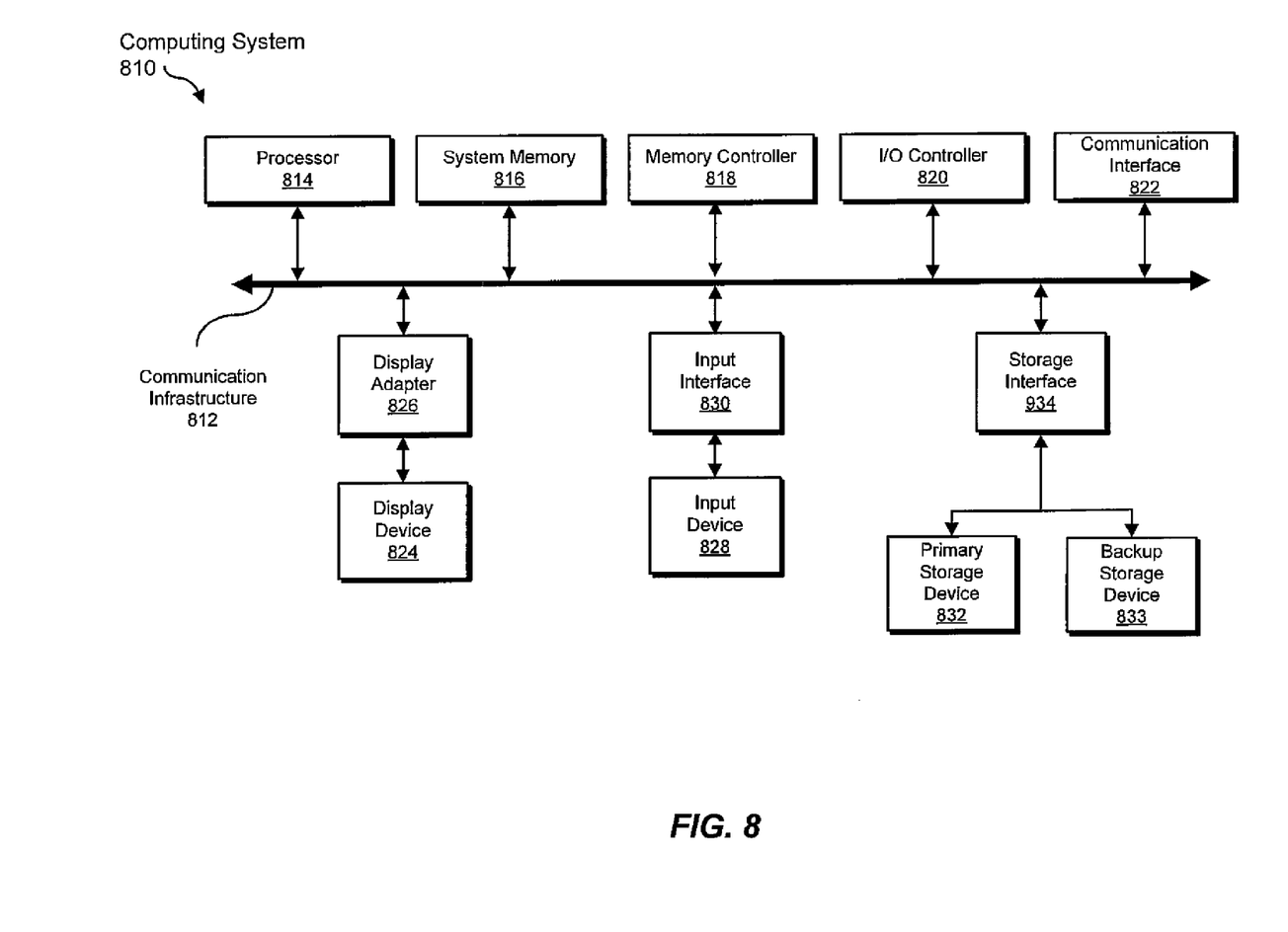
FIG. 8 depicts a block diagram of a computer system suitable for implementing the present systems and methods.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, administering, determining, embedding, preventing, allowing, transmitting, communicating, receiving, verifying, and blocking steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, administering, determining, embedding, preventing, allowing, transmitting, communicating, receiving, verifying, and blocking.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for identifying, administering, determining, embedding, preventing, allowing, transmitting, communicating, receiving, verifying, and blocking steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, administering, determining, embedding, preventing, allowing, transmitting, communicating, receiving, verifying, and blocking steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, administering, determining, embedding, preventing, allowing, transmitting, communicating, receiving, verifying, and blocking steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Storage devices 832 and 833 may also be used, for example, to perform and/or be a means for performing, either alone or in combination with other elements, one or more of the identifying, identifying, administering, determining, embedding, preventing, allowing, transmitting, communicating, receiving, verifying, and blocking steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
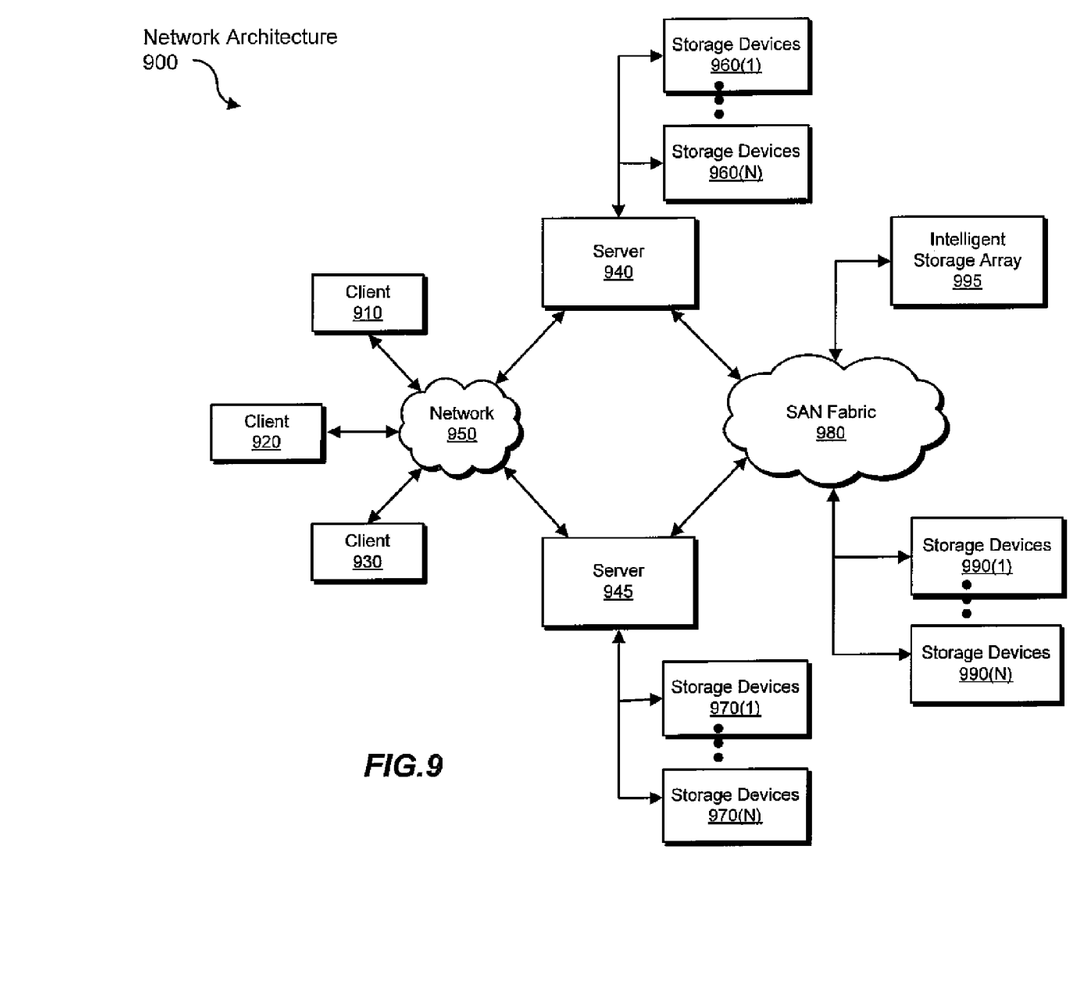
FIG. 9 is a block diagram depicting a network architecture in which client systems, as well as storage servers, may be implemented using the computer system.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, administering, determining, embedding, preventing, allowing, transmitting, communicating, receiving, verifying, and blocking steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing, either alone or in combination with other elements, one or more steps of the exemplary methods described and/or illustrated herein. For example, computing system 810 and/or one or more of the components of network architecture 900 may perform and/or be a means for performing a computer-implemented method for identifying fraudulent websites. The computer-implemented method may comprise identifying a fraudulent-website toolkit. The fraudulent-website toolkit may be programmed for use in creating a fraudulent website.

The method may also comprise determining a characteristic of the fraudulent-website toolkit and using the characteristic of the fraudulent-website toolkit to identify a website created using the fraudulent-website toolkit. In at least one embodiment, using the characteristic of the fraudulent-website toolkit to identify the website created using the fraudulent-website toolkit comprises identifying the website and determining that the website comprises the characteristic of the fraudulent-website toolkit.

According to various embodiments, the method may further comprise searching for websites that comprise the characteristic of the fraudulent-website toolkit. The website may be identified during the searching for websites. In at least one embodiment, searching for websites may further comprise creating a search engine query that includes the characteristic of the fraudulent-website toolkit. The method may comprise directing a search engine to perform a search using the search engine query and receiving a result of the search.

In certain embodiments, the method may comprise determining whether websites identified by the search comprise fraudulent websites. Determining whether websites identified by the search comprise fraudulent websites may comprise at least one of determining whether websites identified by the search comprise known legitimate websites and applying at least one anti-phishing algorithm to the websites identified by the search engine.

According to various embodiments, the method may comprise including uniform resource locators for the fraudulent websites in a security blacklist. In some embodiments, identifying the website may comprise determining that a web browser is attempting to access the website. The method may further comprise determining that the website is potentially fraudulent. The determining may be performed before using the characteristic of the fraudulent-website toolkit to identify the website created using the fraudulent-website toolkit.

In some embodiments, the method may comprise at least one of blocking access to the website created using the fraudulent-website toolkit, blacklisting the website created using the fraudulent-website, toolkit, and reporting the website created using the fraudulent-website toolkit. According to various embodiments, the fraudulent-website toolkit may be a phishing toolkit and the phishing toolkit may be programmed for use in creating a phishing website that looks like a legitimate website.

According to certain embodiments, the characteristic of the fraudulent-website toolkit may comprise at least one of a script file that is not a part of the legitimate website, a log file that is not a part of the legitimate website, a folder that is not a part of the legitimate website, an HTML tag, and/or an email-sender script. In various embodiments, determining a characteristic of the fraudulent-website toolkit may comprise identifying a characteristic of the fraudulent-website toolkit that would distinguish a fraudulent website created by the fraudulent-website toolkit from the legitimate website. In some embodiments, the method may comprise storing the fraudulent-website toolkit in a database of fraudulent-website toolkits.

In some embodiments, a computer-implemented method for identifying fraudulent websites, may comprise identifying a phishing toolkit. The phishing toolkit may be programmed for use in creating a fraudulent website that looks like a legitimate website. The method may also comprise determining a characteristic of the phishing toolkit, determining that a web browser is attempting to access a website, determining that the website is potentially fraudulent, and using the characteristic of the phishing toolkit to determine that the website is fraudulent.

According to at least one embodiment, the method may comprise blocking access to the website created using the phishing toolkit, blacklisting the website created using the phishing toolkit, and/or reporting the website created using the phishing toolkit. In various embodiments, the legitimate website may comprise at least one of a financial institution's website and an e-commerce website. In some embodiments, the method further comprises including the characteristic of the phishing toolkit in a database of phishing toolkit characteristics.

In certain embodiments, a computer-readable medium may comprise one or more computer-executable instructions that, when executed by a computing device, cause the computing device to identify a fraudulent-website toolkit, determine a characteristic of the fraudulent-website toolkit, identify a website, and determine that the website comprises the characteristic of the fraudulent-website toolkit. In some embodiments, the one or more computer-executable instructions may cause the computing device to search for websites that comprise the characteristic of the fraudulent-website toolkit. The website may be identified during the search for websites. In various embodiments, the one or more computer-executable instructions may cause the computing device to determine that a web browser is attempting to access the website.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for identifying fraudulent websites, the computer-implemented method comprising:
   identifying a fraudulent-website toolkit, the fraudulent-website toolkit being programmed for use in creating a fraudulent website, the fraudulent-website toolkit being programmed to reproduce a plurality of different legitimate websites as fraudulent websites;
   determining a characteristic of the fraudulent-web site toolkit, wherein the determined characteristic of the fraudulent-website toolkit is absent from a legitimate website and comprises at least one of a script file, a log file, or a folder;
   using the characteristic of the fraudulent-website toolkit to identify a website created using the fraudulent-website toolkit, comprising:
   selecting a web search engine;
   creating a web search engine query using a web search engine query operator specific to the selected web search engine, the web search engine query including the characteristic of the fraudulent-website toolkit; and
   upon performing the web search engine query, receiving a search result indicating one or more matching websites.

2. The computer-implemented method of claim 1, wherein:
   using the characteristic of the fraudulent-website toolkit to identify the website created using the fraudulent-web site toolkit comprises:
   identifying the website;
   determining that the website comprises the characteristic of the fraudulent-website toolkit.

3. The computer-implemented method of claim 2, further comprising:
   searching for websites that comprise the characteristic of the fraudulent-website toolkit, wherein the website is identified during the searching for websites.

4. The computer-implemented method of claim 1, further comprising:
   determining whether websites identified by the search comprise fraudulent websites,
      wherein determining whether websites identified by the search comprise fraudulent websites comprises at least one of:
   determining whether websites identified by the search comprise known legitimate websites;
   applying at least one anti-phishing algorithm to the websites identified by the search engine.

5. The computer-implemented method of claim 4, further comprising:
   including uniform resource locators for the fraudulent websites in a security blacklist.

6. The computer-implemented method of claim 2, wherein:
identifying the website comprises determining that a web browser is attempting to access the website.

7. The computer-implemented method of claim 6, further comprising
determining, before using the characteristic of the fraudulent-website toolkit to identify the website created using the fraudulent-website toolkit, that the website is potentially fraudulent.

8. The computer-implemented method of claim 6, further comprising at least one of:
blocking access to the website created using the fraudulent-website toolkit;
blacklisting the website created using the fraudulent-website toolkit;
reporting the website created using the fraudulent-website toolkit.

9. The computer-implemented method of claim 1, wherein:
the fraudulent-website toolkit is a phishing toolkit;
the phishing toolkit is programmed for use in creating a phishing website that looks like a legitimate website.

10. The computer-implemented method of claim 9, wherein:
the characteristic of the fraudulent-website toolkit further comprises:
an email-sender script.

11. The computer-implemented method of claim 9, wherein:
determining a characteristic of the fraudulent-web site toolkit comprises identifying a characteristic of the fraudulent-website toolkit that would distinguish a fraudulent website created by the fraudulent-website toolkit from the legitimate website.

12. The computer-implemented method of claim 1, further comprising:
storing the fraudulent-website toolkit in a database of fraudulent-website toolkits.

13. A computer-implemented method for identifying fraudulent websites, the computer-implemented method comprising:
identifying a phishing toolkit, the phishing toolkit being programmed for use in creating a fraudulent website that looks like a legitimate website, the phishing website toolkit being programmed to reproduce a plurality of different legitimate websites as fraudulent websites;
determining a characteristic of the phishing toolkit, wherein the determined characteristic of the phishing toolkit is absent from a legitimate website and comprises at least one of a script file, a log file, or a folder;
using the characteristic of the phishing toolkit to determine whether a website is fraudulent, comprising:
selecting a web search engine;
creating a web search engine query using a web search engine query operator specific to the selected web search engine, the web search engine query including the characteristic of the fraudulent-website toolkit; and
upon performing the web search engine query, receiving a search result indicating one or more matching websites.

14. The computer-implemented method of claim 13, further comprising at least one of:
blocking access to the website created using the phishing toolkit;
blacklisting the website created using the phishing toolkit;
reporting the website created using the phishing toolkit.

15. The computer-implemented method of claim 13, wherein:
the legitimate website comprises at least one of:
a financial institution's website;
an e-commerce website.

16. The computer-implemented method of claim 13, further comprising:
including the characteristic of the phishing toolkit in a database of phishing toolkit characteristics.

17. A non-transitory computer-readable medium comprising one or more computer-executable instructions that, when executed by a computing device, cause the computing device to:
identify a fraudulent-website toolkit, the fraudulent-website toolkit being programmed for use in creating a fraudulent website, the fraudulent-website toolkit being programmed to reproduce a plurality of different legitimate websites as fraudulent websites;
determine a characteristic of the fraudulent-website toolkit, wherein the determined characteristic of the fraudulent-website toolkit is absent from a legitimate website and comprises at least one of a script file, a log file, or a folder;
use the characteristic of the fraudulent-website toolkit to identify a website created using the fraudulent-website toolkit, comprising computer-executable instructions that, when executed by the computing device, cause the computing device to:
select a web search engine;
create a web search engine query using a web search engine query operator specific to the selected web search engine, the web search engine query including the characteristic of the fraudulent-website toolkit; and
upon performing the web search engine query, receive a search result indicating one or more matching websites.

18. The computer-readable medium of claim 17, wherein the one or more computer-executable instructions cause the computing device to:
determine that a web browser is attempting to access the website.

* * * * *